United States Patent [19]

Weber et al.

[11] Patent Number: 5,421,130
[45] Date of Patent: Jun. 6, 1995

[54] HOLDING ELEMENT FOR A GLASS PANE IN THE FRAME OF A MOTOR VEHICLE

[75] Inventors: Eduard-Johann Weber, Egelsbach; Karl-Heinz Schweizer, Lorrach-Brombach; Jurgen Lesser, Rheinfelden, all of Germany

[73] Assignee: General Motors Corporation, Detroit, Mich.

[21] Appl. No.: 151,620

[22] Filed: Nov. 15, 1993

[30] Foreign Application Priority Data

Jan. 30, 1993 [DE] Germany .................. 43 02 662.1

[51] Int. Cl.⁶ .............................................. E06B 3/00
[52] U.S. Cl. .................................. 52/208; 52/204.591; 296/96.12
[58] Field of Search .................. 52/395, 396.01, 403, 52/396.04, 396.07, 394, 395, 764, 204.591, 204.597, 208; 296/84.1, 85, 96.12, 96.14, 96.11

[56] References Cited

U.S. PATENT DOCUMENTS

| | | | |
|---|---|---|---|
| 2,449,875 | 9/1948 | Cadwallader | 52/764 X |
| 2,683,905 | 7/1954 | Beck | 52/764 X |
| 3,381,434 | 5/1968 | Carson | 52/204.591 |
| 3,388,517 | 6/1968 | Wohl et al. | 52/204.591 |
| 4,006,569 | 2/1977 | Kain | 52/204.591 |
| 4,123,100 | 10/1978 | Ellis | 52/394 X |
| 4,622,469 | 11/1986 | Krushwitz | 52/204.591 X |
| 4,683,694 | 8/1987 | Ziegler | 52/204.597 X |
| 4,939,879 | 7/1990 | Gold | 52/204.591 X |
| 5,009,947 | 4/1991 | McManus et al. | 52/204.597 X |
| 5,105,596 | 4/1992 | Wertitsch et al. | 52/397 |
| 5,222,336 | 6/1993 | Yada et al. | 52/204.592 X |

FOREIGN PATENT DOCUMENTS 2039770 2/1972 Germany .................. 52/764

Primary Examiner—Carl D. Friedman
Assistant Examiner—Creighton Smith
Attorney, Agent, or Firm—Ernest E. Helms

[57] ABSTRACT

A holding element serves for the vertical fixation of a pane of glass to be glued in the frame of a motor vehicle. It consists of a holding part made of a hard elastic plastic inserted in a lower cross frame and a number of elastically insertable supporting steps connected to it with supporting faces arranged at equal distances one above the other to support the lower edge of the pane. In order to achieve the finest possible gradation of the individual supporting steps and simultaneously a no-play mounting, the supporting steps are designed to engage one another in a lamellar manner and are connected in each case to the holding part on both sides of the support area via elastically flexible cross members on their lamellar ends. In this case, the connecting cross members are molded directly on the holding part on the one side of the support area, while the connecting cross members are molded on a separate support piece on the other side of the support area, which may be introduced into a corresponding recess in the holding part and locked in place there.

3 Claims, 3 Drawing Sheets

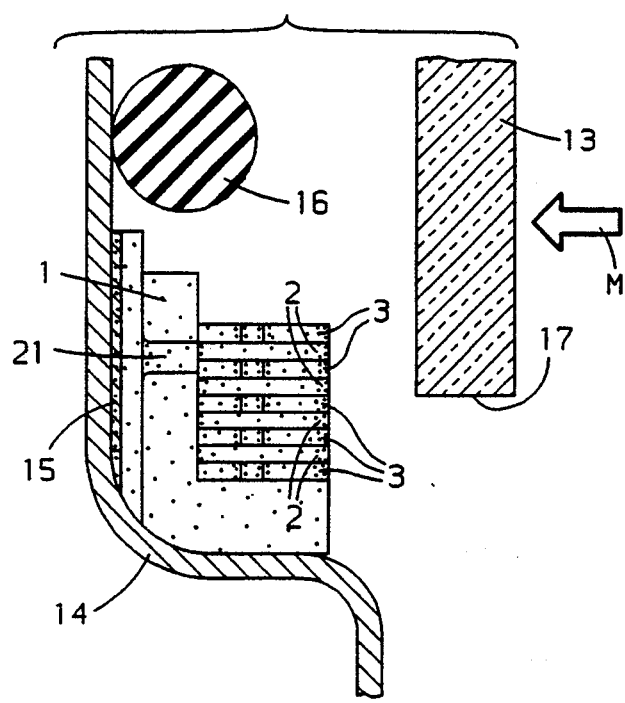
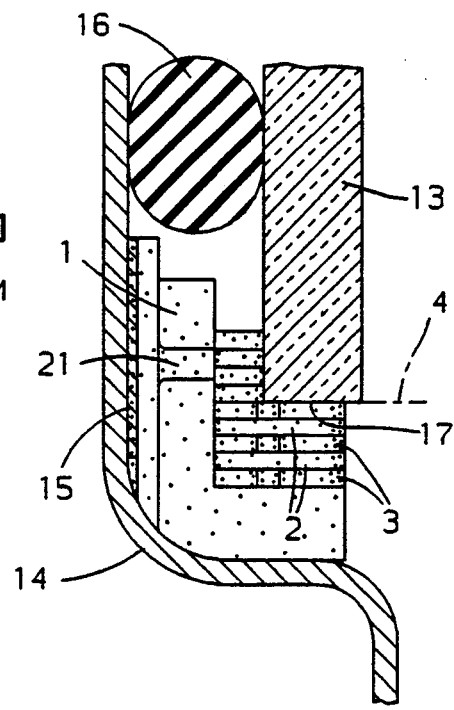
FIG. 5  FIG. 6
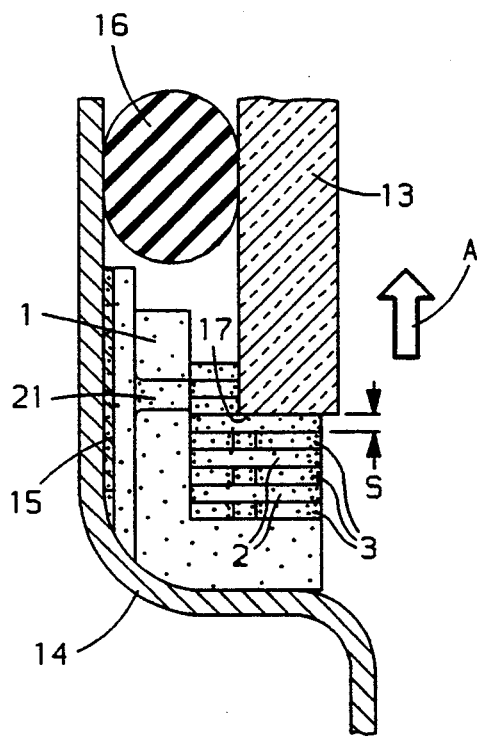
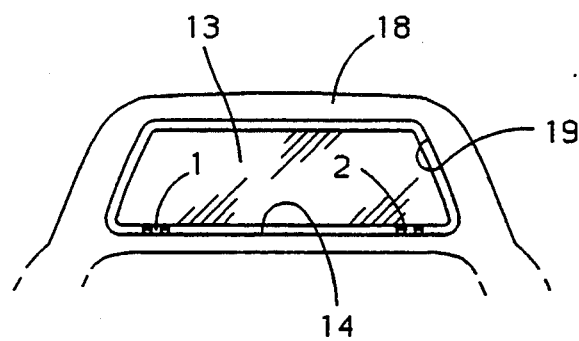
FIG. 7  FIG. 8 ically-mentioned
HOLDING ELEMENT FOR A GLASS PANE IN THE FRAME OF A MOTOR VEHICLE This invention pertains to a holding for vertical fixation of a glass pane to be glued in the frame of a motor vehicle.

Such glass panes are usually installed automatically using a free-arm robot. The panes in this case must be placed at a preassigned distance from the window frame and be fixed by holding elements until the glue sets.

The invention starts with a holding element in which supporting beams arranged at close distances one above the other are connected by elastically compressible spring legs to form a single piece with the holding part. In this case, the pane after its placement rests on the supporting beams located under the edge of the pane in each case, while the overlying support beams are pushed away from the pane.

When the pane is positioned by the robot, however, frequently tolerance deviations with respect to the window frame occur which must be compensated via a readjustment of the pane which has already been pressed against the adhesive. This requires a subsequent displacement of the pane in the plane of its installation, it being necessary to align the upper edge of the pane to a certain preassigned degree with the upper cross frame.

In the case of a conventional holding element, the position of the pane can easily be corrected downward by subsequently pressing in by hand the beams which are in the way of this compensating movement. In the case of upward alignment of the pane, conversely, the lowermost support beams pressed in by the pane edge, because of the restoring force of the spring legs, can spring back again below the pane edge and thus support the pane at the newly set level.

However, this holding element has various disadvantages. On the one hand, the thickness of the supporting beams necessary for structural reasons results in too coarse a gradation between the individual supporting faces, while on the other hand, a certain distance is required between the individual supporting beams for unmolding-engineering reasons, which, in the case of use of a holding element, must first be pressed away from the pane to be supported before the supporting effect is achieved. The higher the bottom pane edge to be positioned is, the more supporting beams must be pressed on one another and the farther the pane slides down until all beams lie firmly on one another. The positioning is, therefore, too inaccurate for practice.

In view of the above-named disadvantages and the fact that the supporting function of the holding element is required only until the glue has set, the task of the invention is seen as designing the initially-mentioned holding element in such a way that a finer gradation between the individual supporting surfaces is achieved and the yielding of the supporting surfaces under a load by the pane is avoided.

This problem is solved according to the present invention by the fact that the supporting steps are designed to engage one another in a lamellar pattern and in each case are connected at one of their lamellar ends via elastically flexible cross members to the holding part on both sides of the support area in such a way that the connecting cross members are arranged alternately on the one side and the other side of the support area.

As a result of the lamellar-like design of the supporting steps, the additional advantage is achieved that the holding element can be designed to be especially flat and therefore to occupy only a little space in the lower cross frame.

As a result of the design according to this invention, the mutually engaging lamellae can be injected in a single casting mold, separated in space but connected as one piece by tear-off cross members and then brought together, at which time the supporting piece of the lamellae can be pressed rapidly and simply into the corresponding recess of the holding part directly after injection.

BRIEF DESCRIPTION OF THE DRAWINGS

In the drawings, a preferred example of the embodiment of this invention is shown and is explained in detail in the following, where:

FIG. 5 shows a holding element installed in the window frame of a motor vehicle when the pane is being pressed on;

FIG. 6 shows the same installed holding element after the pane is pressed on;

FIG. 7 shows the same installed holding element after the alignment of the pane in the direction of the arrow "A";

FIG. 8 is a perspective view of the holding element shown in FIG. 7 before placement of the window pane.

DESCRIPTION OF THE PREFERRED EMBODIMENT

Figure 1:
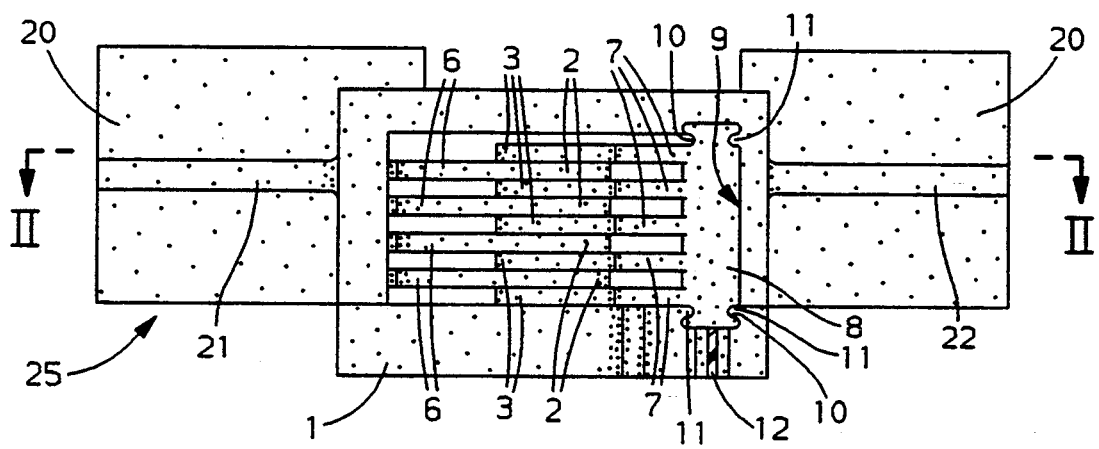
FIG. 1 shows the holding element in frontal view.

A holding element 25 shown in the Figures serves for the vertical fixation of a glass pane 13 to be glued in the window frame 19 of a motor vehicle 18 such as a windshield or rear window 13, where the holding element 25 has to support the pane 13 only until the adhesive joint 16 between the pane 13 and the window frame 19 has set.

The holding element consists of a holding part frame 1 inserted into a bottom cross frame 14 (of the window frame 19) of hard elastic plastic and a number of supporting steps 2 and 3 connected to it and extending into the support area 5 with supporting faces 4 arranged at the same distance "s", one above the other. The holding part frame 1 has a two-part base 20. The holding part frame 1 has a first side 21 and a second side 22.

A first set of individual supporting steps 2 and a second set of supporting steps 3 in this case are designed as lamellae and engage one another while crossing (or overlapping) one another in a support area 5 so that they lie one atop the other in this area 5. The supporting lamellae 2 and 3 in each case are connected at one of their ends extending from the holding part frame 1 in an inclined fashion via elastically flexible cross members 6 and 7 on both sides of the support area 5 to the holding part frame 1 in such a way that the connecting cross members 6 and 7 are alternately arranged on the one side and on the other side of the support area 5. The individual support steps 2, 3 support as pane edge bottom 17 in the direction of arrow A generally perpendicular to their axis of extension.

The connecting cross members 6 of the supporting steps 2 in this case are shaped directly (integrally) on the holding part 1 on one side of the support area 5. Conversely, the connecting cross members 7 of the supporting steps 3 are integrally shaped on the other side of the support area 5 on a separate subframe support piece 8 which can be inserted into a recess 9 in the holding part 1 and be held fast there in such a way that the molded-on supporting lamellae 3 engage the interstices of the other supporting lamellae 2 molded directly on the holding part 1 and completely fill it.

Figure 2:
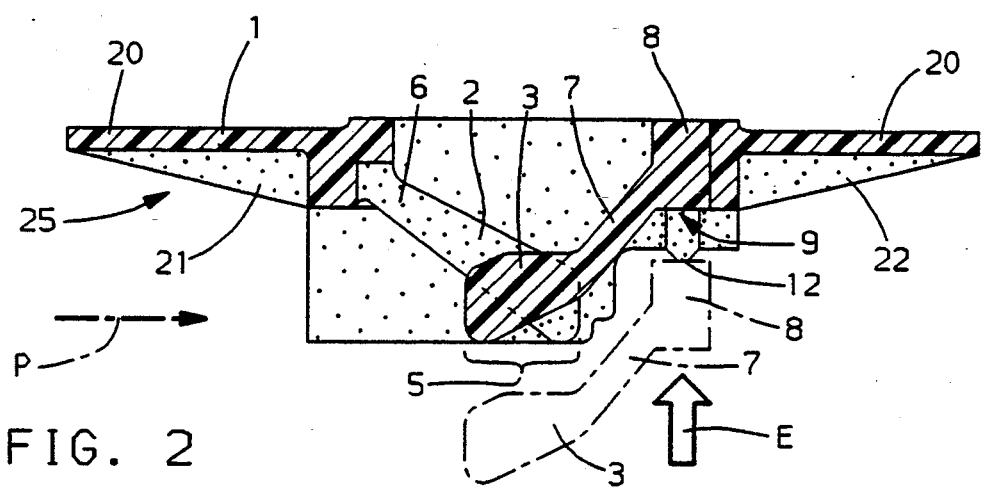
FIG. 2 shows the longitudinal section of the holding element along line II—II in FIG. 1.
Figures 3, 4:
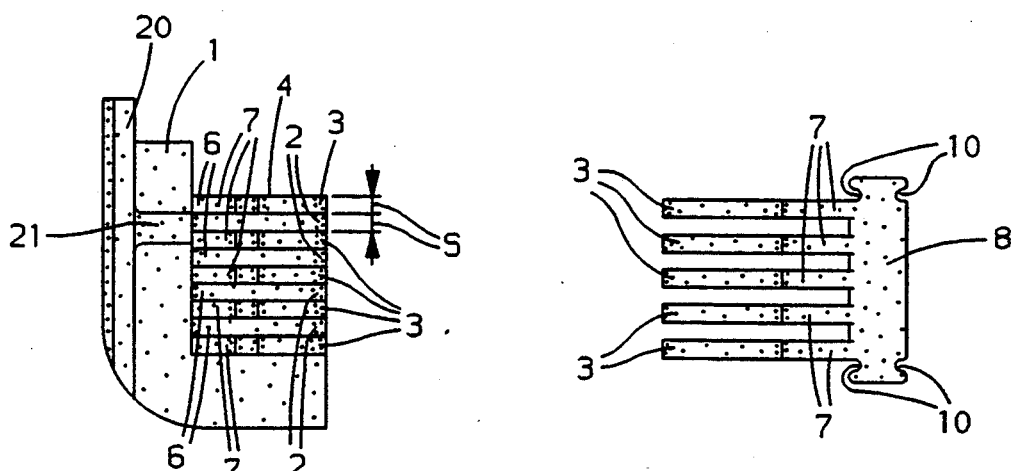
FIG. 3 is a side view of the holding element in the direction of arrow "P"
FIG. 4 shows a separate supporting piece with supporting lamellae shaped on it.
Figure 9:
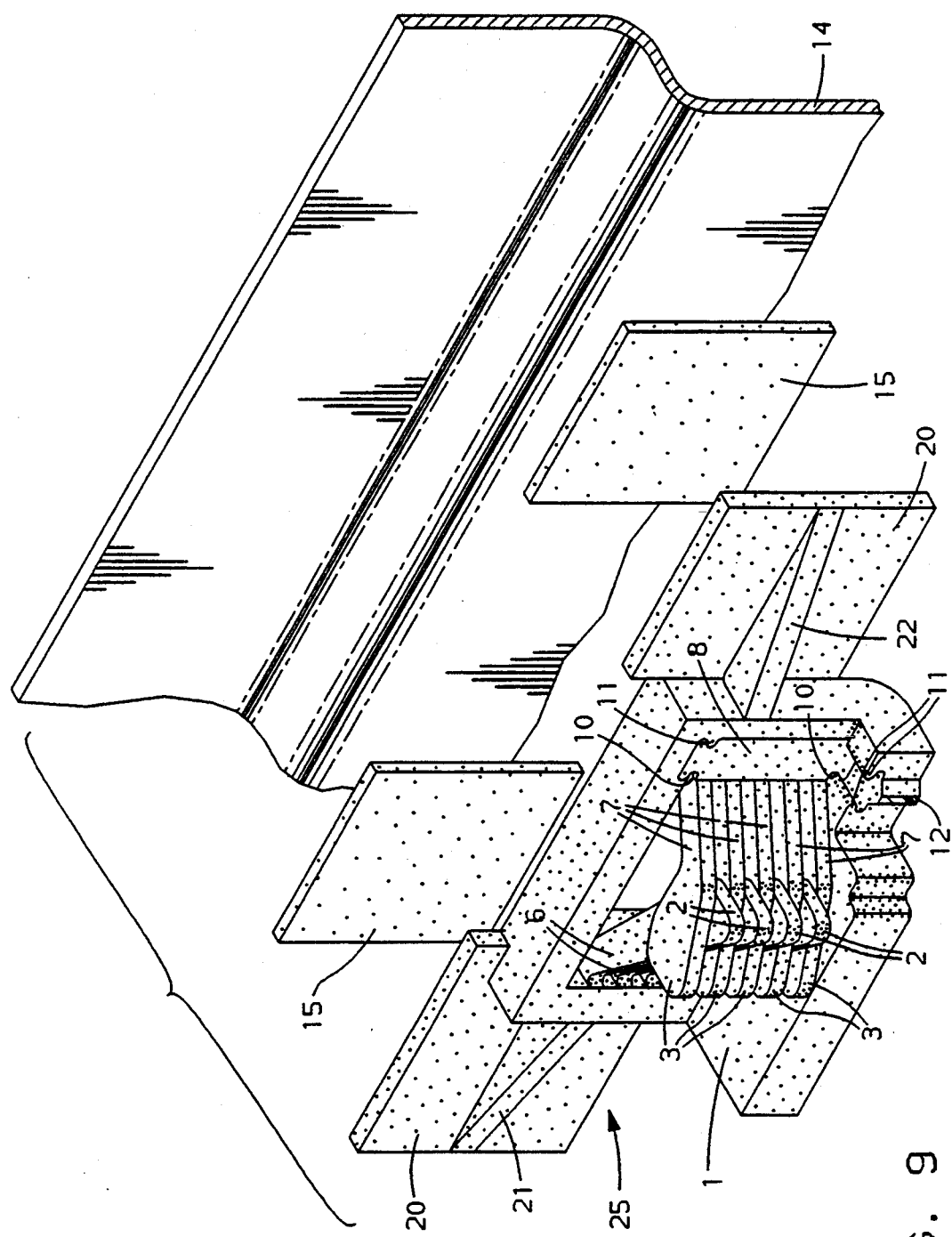
FIG. 9 is an enlarged exploded view of the holding element before the window glass is set.

The subframe support piece 8, as shown in FIG. 4, is provided at its ends, i.e. on both sides of the connecting cross member 7, with grooves 10 which run parallel to the lamella plane and in the direction of insertion of the arrow "E" (FIG. 2).

Accordingly, the recess 9 in the holding part frame 1 has compliant spring studs 11 of the frame member extending inwardly into which the support piece subframe 8 with the grooves 10 can be pushed.

In this case, it must be noted that the subframe support piece 8 with the lamellae 3 is located during production in the casting mold (not shown) in front of the recess 9 of the holding part frame 1 and connected to it by so-called tear-off cross members 12 (FIG. 2). After injection of the entire holding element, the subframe support piece 8 is inserted in the direction of arrow "E" into the recess 9, at which time the supporting lamellae 3 "comb" together with the supporting lamellae 2 formed on the holding part frame 1.

In FIGS. 5 through 9, the function of the holding element is illustrated for clarity. In FIG. 5, the glass pane 13 to be fixed is situated directly in front of the holding element which is glued in the window frame lower cross frame 14 with the aid of a double-sided adhesive tape 15. Above the holding element in the window frame cross frame 14, a strip of adhesive 16 is applied against which the glass pane 13 is pressed in the direction of the arrow "M". The lamellar steps 2 and 3 are forced away behind the lower pane edge 17, while the lamellar steps 2 and 3 located below it remain in their original supporting position.

FIG. 6 shows the mounting situation after the glass pane 13 is pressed on, the lower edge of the pane 17 being supported on the remaining lamellar steps 2, 3.

In FIG. 7, the glass pane 13 has been raised a little in the direction of arrow "A" for realignment, while the uppermost supporting lamella 13, which has already been forced away because of the spring force of the connecting cross member 7 is forced by spring action back under the pane edge 17 so that the pane 13 is now held in the raised position until the adhesive strip 16 has set.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. A holding element for vertical fixation of a lower edge of a pane of glass to be glued in a lower cross frame of a motor vehicle comprising:
   a frame member of hard elastic plastic having first and second sides, the frame member having a base;
   a first set of flexible laminate supporting steps extending in an inclined fashion from the frame base, the first set of support steps having on one end a support area and on the opposite end a connecting member, the connecting member being elastically joined to the first side of the frame member, the first set of supporting steps being equidistantly spaced from one another;
   a second set of flexible laminate supporting steps extending in an inclined fashion from the frame base, the second set of support steps having on one end a supporting area and on an opposite end a connecting member, the connecting member being elastically joined to the second side of the frame member, the second set of flexible steps being spaced equidistantly from one another, and the second set of support steps being alternately spaced with the first set of flexible laminate support steps in a lamellar fashion and the support areas of the second support steps overlapping the support areas of the first support steps.

2. A holding element as described in claim 1 wherein the first set of support steps is integrally formed on the frame member and the second set of support steps is integrally joined to a subframe member which is capable of being inserted and locked into a corresponding recess in the frame member.

3. A holding element as described in claim 2 wherein the subframe member on both sides of the second set of support steps is provided with grooves running parallel to the plane of the support steps, the subframe being compliantly held by compliant spring studs of the frame member extending inwardly into the grooves of the subframe member.

* * * * *